Figure 1:
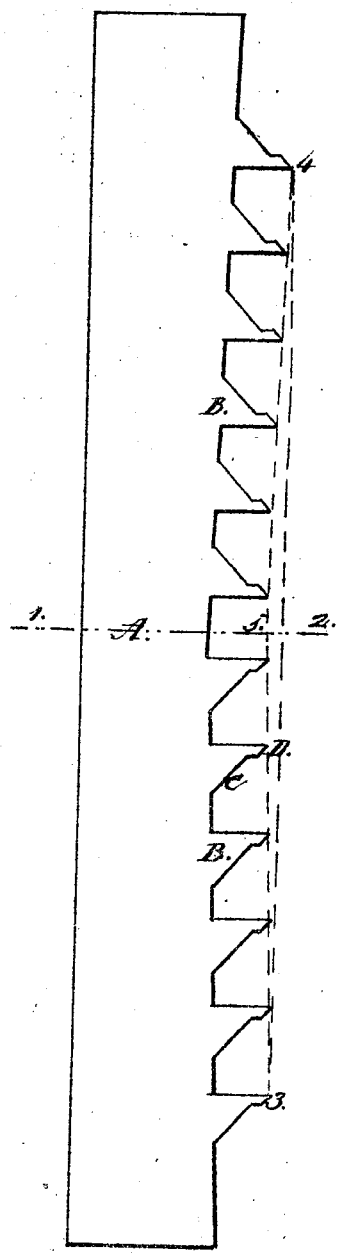
Figure 2:
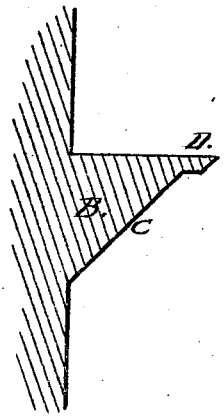

J. Davis.
Saw.

N° 72983  Patented Jan. 7, 1868.

Witnesses: Edward Wilhelm, G. Burkhardt

James Davis, Inventor
By E.B. & W.H. Forbush, attys.

United States Patent Office.

JAMES DAVIS, OF BUFFALO, NEW YORK.

Letters Patent No. 72,983, dated January 7, 1868.

IMPROVEMENT IN SAWS.

The Schedule referred to in these Letters Patent and making part of the same.

TO ALL WHOM IT MAY CONCERN:

Be it known that I, JAMES DAVIS, of the city of Buffalo, county of Erie, and State of New York, have invented certain new and useful Improvements in Saws; and I do hereby declare that the following is a full, clear, and exact description thereof, reference being had to the accompanying drawings, making a part of this specification.

The nature of my invention consists, first, in making rectilinear mill or gang-saws with the cutting-edges of the saw-teeth of both the upper and lower halves of the saw towards the centre thereof, and giving both the upper and lower halves a forward rake or set, so that the upper half will cut during the downward stroke, and the lower half during the upward stroke; second, in extending the point of a saw-tooth beyond the line of the back of the tooth, to give greater ease and facility in sharpening same. In the accompanying drawings—

Figure I is a side elevation of a mill or gang-saw, with its teeth arranged according to my invention.

Figure II is a detail view of my improved saw-tooth.

Like letters refer to like parts in each of the figures.

A represents the saw-plate, and B the saw-teeth. The teeth above the centre line 1-2 have the cutting-edges C on the side nearest said centre line, as have also the teeth below the centre line. The cutting-edges are also slightly inclined or pitched towards the centre line. The teeth above the centre line have a forward set or rake, as shown by the angle formed by the line 4-5 (drawn through the points of the teeth) with the vertical line 3-4. The teeth below the centre line have also a forward set or rake, the reverse of those above, as shown by the line 3-5 drawn through their points. This arrangement of the teeth enables the saw to cut during both its downward and upward stroke, the double rake clearing the kerf in both directions.

By cutting, during both up and down stroke, the strain upon the machinery, by which the motion is produced, is made more equal and uniform than with the single-cutting saw, and the amount of work which the saw will accomplish is doubled, with only a slight increase of driving-power.

D represents the point of the tooth, which is projected beyond the back line e of the tooth. The length of the projection, measured parallel with the back line e, should be about five-eighths of an inch, or sufficient to give it the requisite strength. In sharpening the saw, only this projection will require filing, thereby saving greatly in time, labor, and wearing of files.

Having thus described my invention, what I claim, is—

1. Making the saw-teeth above and below the centre line 1-2 with their cutting-edges toward said line, and the rake or set above the reverse of that below the centre line, in the manner and for the purpose described.

2. The projection D at the point of the saw-tooth, for the purpose set forth.

JAMES DAVIS.

Witnesses:
B. H. MUEHLE,
EDW. WILHELM.